United States Patent [19]

Jönsson et al.

[11] Patent Number: 5,006,300

[45] Date of Patent: Apr. 9, 1991

[54] SEALING DEVICE FOR NUCLEAR POWER REACTOR

[75] Inventors: Erik Jönsson; Lars Törnblom, both of Västerås, Sweden

[73] Assignee: AB Asea-Atom, Västerås, Sweden

[21] Appl. No.: 174,171

[22] Filed: Mar. 28, 1988

[30] Foreign Application Priority Data

Mar. 30, 1987 [SE] Sweden ............................... 8701310

[51] Int. Cl.$^5$ ............................................. G21C 13/028
[52] U.S. Cl. ................................... 376/203; 277/110; 277/190
[58] Field of Search ................. 277/110, 190; 376/203

[56] References Cited

U.S. PATENT DOCUMENTS

| | | | |
|---|---|---|---|
| 3,468,566 | 9/1969 | Nietzel | 277/110 |
| 4,480,841 | 11/1984 | Schukei et al. | 277/190 |
| 4,611,813 | 9/1986 | Guerrero | 277/190 |
| 4,826,217 | 5/1989 | Guerrero | 277/110 |

Primary Examiner—Stephen C. Bentley
Attorney, Agent, or Firm—Watson, Cole, Grindle & Watson

[57] ABSTRACT

A sealing device for sealing a leak occurring inside a reactor pressure vessel at the vicinity of a weld between a control rod drive (CRD) tube and a surrounding CRD stub tube which communicates with an opening in the wall of the pressure vessel. An inner sealing sleeve of a soft metallic material and with an outer frusto-conical surface is fitted over the tube and the CRD stub tube, and an outer sealing sleeve of a hard metallic material and with an inner frusto-conical surface is fitted over the inner sealing sleeve. On each side of the crack special contact surfaces are formed between the inner sealing sleeve and the tube or the CRD stub tube. As the outer sealing sleeve is pressed in over the inner sealing sleeve, the inner sealing sleeve is pressed by the frusto-conical surfaces, moving against each other, against the tube and the CRD stub tube, thus providing sealing at the contact surfaces.

8 Claims, 2 Drawing Sheets

SEALING DEVICE FOR NUCLEAR POWER REACTOR

TECHNICAL FIELD

This invention relates to means for sealing a leak of pressurized fluid from a pressure vessel at the point where a sleeved tube passes through the wall of the pressure vessel and has particular reference to the sealing of leaks appearing in the vicinity of control rod control equipment in the reactor vessel of a nuclear reactor.

DISCUSSION OF PRIOR ART

The output power from a nuclear power reactor is controlled by inserting control rods to a greater or lesser degree into the reactor core enclosed within a reactor pressure vessel. The control rods are influenced by operating rods which are located in long tubes. These tubes extend through an associated opening in the wall of the pressure vessel. Around each tube, on the inside of the pressure vessel, a supporting sleeve is arranged, each supporting sleeve being located in an opening in the wall of the pressure vessel and being sealed to the wall by means of a weld formed between the supporting sleeve and the pressure vessel wall. At its other end the supporting sleeve is sealed to the tube, also by means of a weld around the tube. In some cases, in connection with older boiling water reactors, these supporting sleeves, or—as they are also called—control rod drive stub tubes (hereinafter abbreviated CRD stub tubes), have cracked. The cracking commonly occurs in a zone which was subjected to heat when the weld between the tube and the CRD stub tube was made.

FIG. 1 of the accompanying drawings shows a prior art arrangement for sealing control rod tubes to the pressure vessel of a nuclear reactor. In FIG. 1, 1 designates the wall of the pressure vessel and 2 designates one of a large number of control rods 2 which project into the core. The control rod 2 is influenced by an operating rod 3 which is located in a tube 4 for up and down movements as shown by the arrows A. The tube 4 extends through an opening 5 in the wall 1, and around the tube 4 a CRD stub tube 6 is arranged. The CRD stub tube 6 is sealed to the wall 1 of the vessel by means of a weld 7 and is sealed to the tube 4 by means of a weld 8. The pressure vessel is made of carbon steel with an internal stainless coating (not shown). The CRD stub tube 6 is made of a stainless material. Now, if a crack should arise (say at 9 in FIG. 1), it is self-evident that water may leak out from the interior of the reactor vessel into the opening 5 and out through this opening in the gap between the opening 5 and the tube 4. Attempts have been made to provide a seal by rolling the tube 4 outwardly against the wall 1 of the vessel. After some time, however, a new leakage has invariably arisen. In other cases, a seal in the form of a stuffing box containing graphite tape as the sealing agent has been used. Even this seal is not wholly satisfactory, among other things due to the fact that it does not provide any significant mechanical support of the region around the crack 9 which can thus continue to grow. The crack 9 tends to arise in the vicinity of the weld 8 (i.e. in material of the CRD stub tube which became heated when the weld 8 was formed). There is thus a need for an improved sealing arrangement which will prevent leakages occurring in the vicinity of cracks which do form.

SUMMARY OF THE INVENTION

The present invention seeks to meet the aforesaid need and provides, inter alia, that incipient cracks, which have not yet started leaking, are prevented in their further growth. The invention is characterized in that the sealing device comprises at least one inner sealing sleeve of a softer metallic material which can be fitted over the tube and the CRD stub tube, and an outer sealing sleeve of a harder metallic material which is arranged over the inner sealing sleeve and has an inner frusto-conical surface. On each side of the expected site of a leak or the crack there are formed contact surfaces between the inner sealing sleeve and the tube or the CRD stub tube. The outer sealing sleeve is adapted to be fitted over the inner sealing sleeve, thus achieving a sealing deformation of the softer inner sealing sleeve at the mentioned contact surfaces. This results in stable sealing and good mechanical support of the cracked part of the tube or the CRD stub tube.

The frusto-conical surfaces on the sealing sleeves are desirably dimensioned so as to obtain self-locking. As additional security, the inner sleeve may be provided with an outer locking nut. The sealing will become even more effective if the inner sleeve is internally provided at its ends with bands or arrays of closely spaced grooves or ridges around its circumference. These grooves or ridges will be subjected to a higher contact pressure against the underlying surface than could so easily be obtained if the grooves or ridges were not provided. A corresponding increase of the sealing pressure can be brought about by a suitable machining of the tube or the outer surface of the CRD stub tube by means of, for example, turning. The outer surface of the CRD stub tube can then be machined so that different diameters on either side of the likely crack area are attained.

Another problem may arise if the sealing device is applied over a crack which has not developed into a leak, i.e. if the device is used for a preventive purpose, namely, in that high pressures may be obtained in the space where the crack is located between the inner more slender sleeve and the underlying machined CRD stub tube. Water trapped in this space will increase in volume as the temperature is raised. To avoid a harmful increase in pressure, a compressible volume, for example in the form of a tube, sealed at its ends, may be arranged as a piston ring around the CRD stub tube.

If a crack is situated or arises in the wall of the tube at a location where the tube is outside the CRD stub tube, difficulties may arise in sealingly applying the inner sealing sleeve over the crack. This is due to the fact that the outer diameters of the tube and of the CRD stub tube differ considerably. One way of effecting a functioning seal despite these difficulties is to make the inner sleeve in two parts, one part having a smaller diameter for sealing against the tube, and one part having a larger diameter for sealing against the CRD stub tube, both parts of the sleeve being provided with frusto-conical outer surfaces. The outer sealing sleeve can then be made in one piece but is provided with two inner frusto-conical surfaces, separated from each other, each designed to match with a respective one of the frusto-conical outer surfaces on the inner sleeve.

The necessary force for applying the clamp type joint described above is best obtained by means of a hydraulic cylinder. For a double clamp type joint, two hydraulic cylinders would be needed.

BRIEF DESCRIPTION OF THE DRAWINGS

The invention will now be further described, by way of example, with reference to the accompanying drawings, in which.

DESCRIPTION OF PREFERRED EMBODIMENTS

Figure 2:
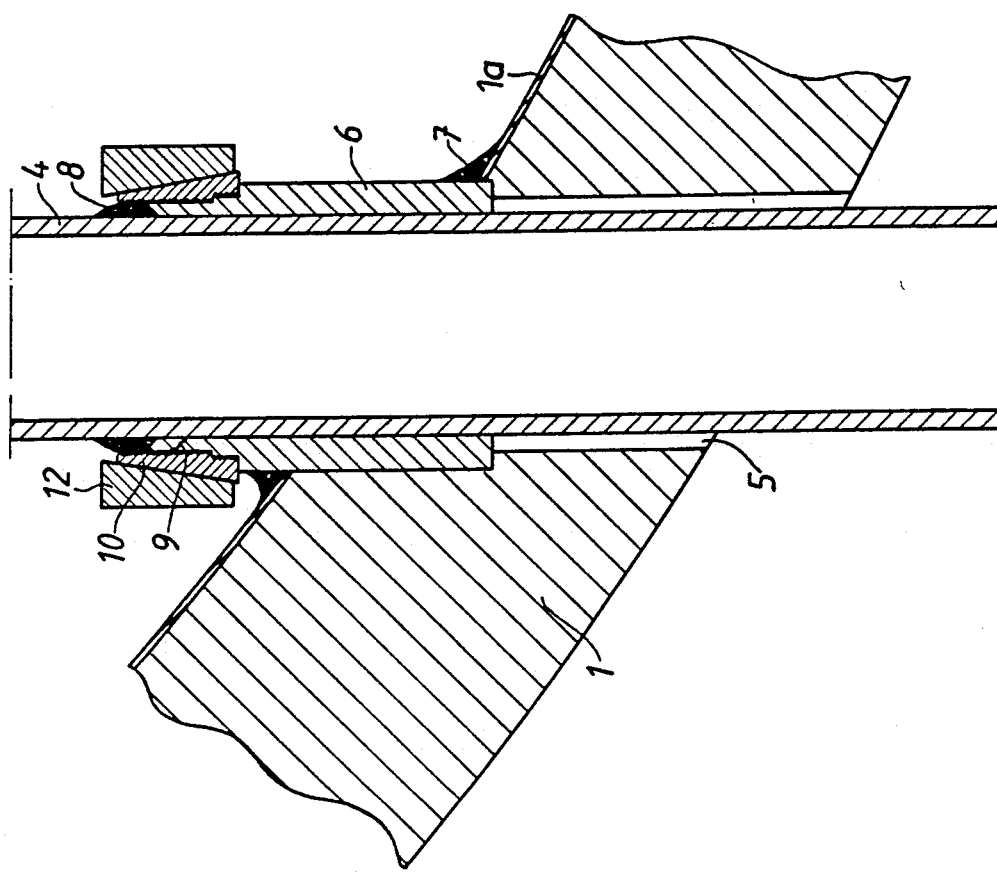
FIG. 2 is a sectional view of part of the wall of the pressure vessel of a nuclear reactor showing a first embodiment of means in accordance with this invention for preventing leaks occurring at a cracked CRD stub tube.
Figure 1:
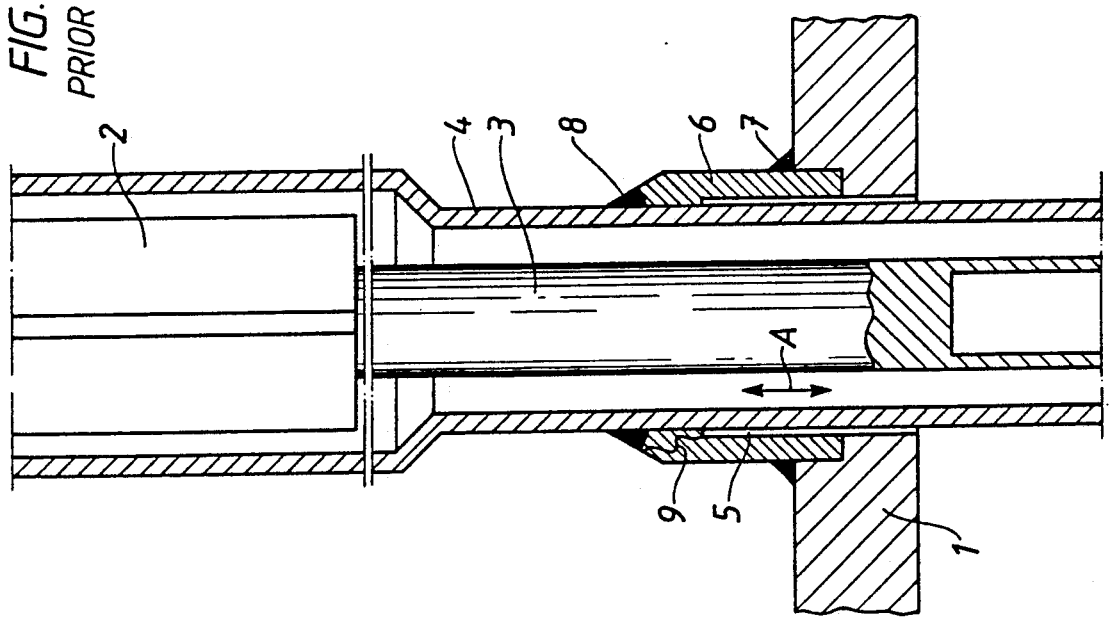
FIG. 1 is a sectional view of part of the wall of the pressure vessel of a nuclear reactor showing a prior art CRD stub tube exhibiting a crack and has already been discussed.

In FIG. 2 of the accompanying drawings, the numeral 1 again designates the wall of a reactor pressure vessel. Through an opening 5 in the wall 1 there extends a tube 4 intended to house an operating rod (not shown) leading to one of the control rods of the reactor. Around the tube 4, on the inside of the wall 1, there is arranged a CRD stub tube 6. The CRD stub tube is fixed to the wall 1 by a weld 7 and is fixed to the tube 4 by means of a weld 8. Close to the weld 8 in the CRD stub tube 6 a crack 9 has been shown, through which reactor water may leak out via the gap formed between the CRD stub tube 6 and the tube 4. The inside of the wall 1 is coated with a stainless material shown at 1a. The CRD stub tube 6 is also made of a stainless material.

To bring about a satisfactory seal, the CRD stub tube 6 is machined so that a part of its outer surface becomes completely smooth. To facilitate the mounting of the sealing device, the machining of the CRD stub tube 6 can be carried out to two different diameters, the larger diameter being nearer to the wall 1. The inner sealing sleeve 10, which is to be of a soft metallic material, for example that known under the Trade Mark "Inconel 600", is internally provided, at its ends, with projecting grooves 11 around the circumference. These grooves 11 make contact with the CRD stub tube 6 on each side of the crack 9. The sealing sleeve 10 is provided with an outer frusto-conical surface, over which is fitted an outer sealing sleeve 12 with an inner frusto-conical surface. The sealing sleeve 12 is made of a hard metallic material, for example "Inconel X-750", and deforms the inner soft sleeve 10 when it is fitted over this sleeve, thus obtaining satisfactory sealing.

Figure 3:
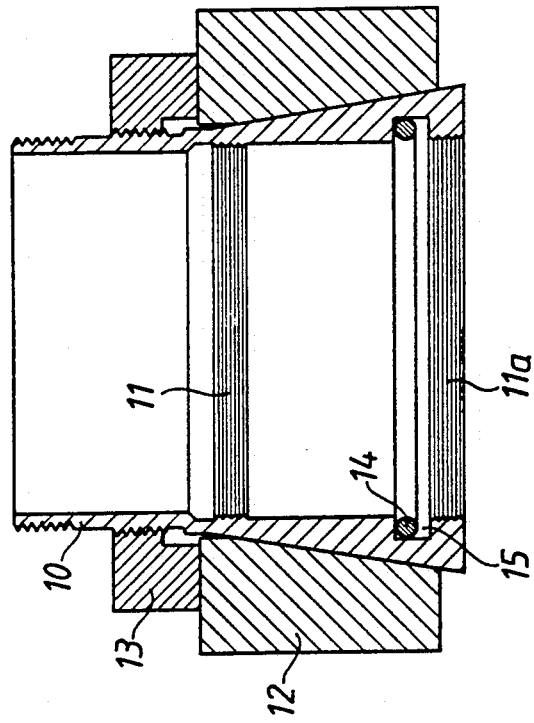

FIG. 3 shows how the outer sealing sleeve 12 can be locked over the inner sleeve 10 by means of a locking nut 13 threaded on the inner sleeve 12. FIG. 3 also shows how arrays of closely spaced grooves 11 can be provided on the inner face of the sleeve 12 and that the sleeve 10 has a larger diameter in the vicinity of an array of lower grooves 11a than at the upper ones.

To avoid the occurrence of an overpressure in the reactor water which may possibly be trapped in the space below the sleeve 10, between its upper and lower arrays of grooves 11 and 11a, a compressible volume is arranged at that location, for example a gas-filled elastic tube, sealed at the ends, which may be bent as a piston ring 14 and be disposed in a slot 15 in the inner sealing sleeve 10.

Figure 4:
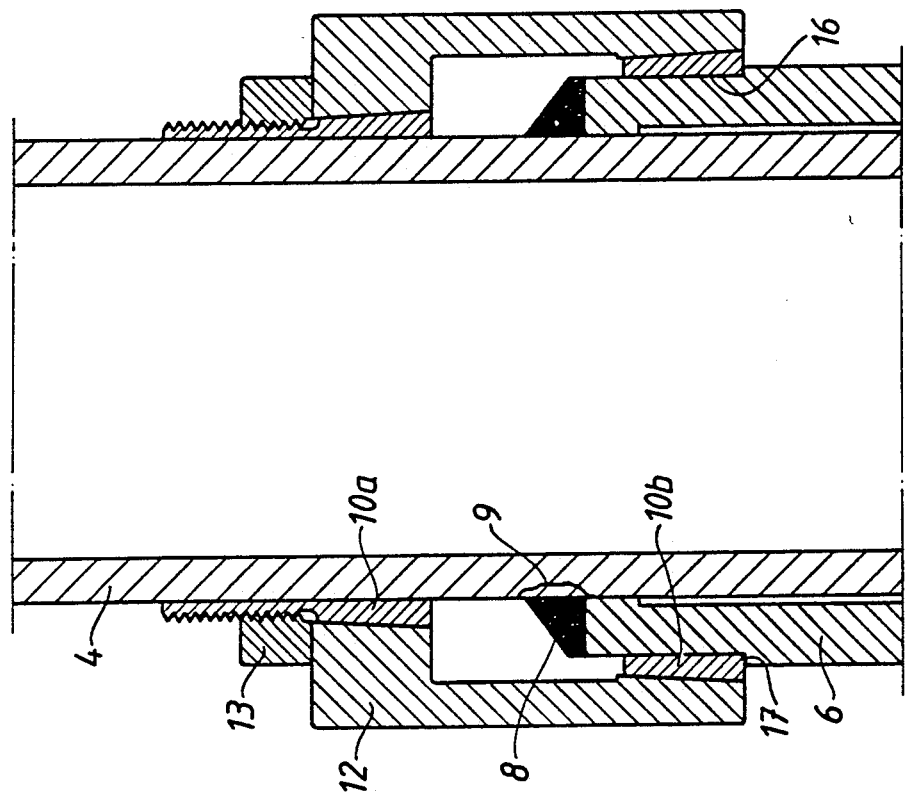
FIGS. 3 and 4 show modified arrangements for use in accordance with the invention.

In certain cases a crack 9 may be situated very inconveniently. FIG. 4 shows such a situation, the crack here being located in the tube wall at the vicinity of the weld 8. It is clear that it would be impossible in this case to employ a thin soft sealing sleeve 10 with the same diameter over its entire length. A solution to this problem is to divide the inner sleeve into two parts, one having a smaller diameter, sealing sleeve 10a, and one having a larger diameter, sealing sleeve 10b. Both sleeves 10a and 10b are provided with frusto-conical outer surfaces. The outer sealing sleeve 12 is then made in one piece but with two separated frusto-conical inner surfaces, each one fitting a respective one of the sleeves 10a and 10b.

When mounting the above device, two hydraulic jacks are needed, as mentioned above, one of these pushing the outer sleeve 12 downwards, the other pulling the inner sleeve 10a upwards. The sleeve 10b is applied on a region 16 of the CRD stub tube 6 which has been reduced in diameter and is prevented from being pushed further downwards by a shoulder 17.

It is clearly possible to modify the arrangements illustrated in FIGS. 2, 3 and 4 and to conceive of other arrangements within the scope of the following claims. It should be understood that all such arrangements fall within the ambit of this invention.

What is claimed is:

1. A sealing device for sealing a possible leak inside a nuclear reactor pressure vessel, in which an operating rod for controlling a control rod of the reactor is arranged in an elongated tube, extending through an associated opening in the wall of the vessel, a CRD stub tube surrounding the tube on the inside of the wall of the pressure vessel and communicating with said opening, one end of said CRD stub tube being joined to the tube by means of a first weld, and the stub tube being joined to the wall around said opening by means of a second weld, characterized in that the sealing device comprises at least one inner sealing sleeve of a softer metallic material, which may be fitted over the tube and the CRD stub tube and has an outer frusto-conical surface, and an outer sealing sleeve of a harder metallic material, which is arranged over said inner sealing sleeve and has an inner frusto-conical surface, on each side of said possible leak there being formed contact surfaces between the inner sealing sleeve and at least one of the tube and the CRD stub tube, the outer sealing sleeve being adapted to be fitted over the inner sealing sleeve, thus achieving a sealing deformation of said contact surfaces of the inner sealing sleeve, 2. A sealing device according to claim 1, wherein the inner sealing sleeve is provided with an outer locking nut in order to lock the outer sealing sleeve over the inner sealing sleeve.

3. A sealing device according to claim 1, wherein the contact surfaces include a band of grooves extending around the inner periphery of the inner sealing sleeve.

4. A sealing device according to claim 2, wherein the contact surfaces include a band of grooves extending around the inner periphery of the inner sealing sleeve.

5. A sealing device according to claim 1, wherein a slot is provided in the inner sealing sleeve, in the area between the contact surfaces around the inner periphery and a gas-filled ring is arranged in said slot.

6. A sealing device according to claim 2, wherein a slot is provided in the inner sealing sleeve, in the area between the contact surfaces around the inner periphery and a gas-filled ring is arranged in said slot.

7. A sealing device according to claim 3, wherein a slot is provided in the inner sealing sleeve, in the area between the contact surfaces around the inner periphery and a gas-filled ring is arranged in said slot.

8. A sealing device according to claim 1, wherein the inner sealing sleeve is divided into two parts, one part having a smaller inner diameter and intended for sealing against the tube, and one part having a larger inner diameter for sealing against the CRD stub tube, both parts having frusto-conical outer surfaces, and wherein the outer sealing sleeve is provided with two inner frusto-conical surfaces, separated from each other, which two inner surfaces fit over said respective frusto-conical outer surfaces of the two parts of the inner sealing sleeve in order to provide a sealing contact between the inner sealing sleeve and each of the tube and the CRD stub tube, respectively, when the outer sealing sleeve is fitted over the inner one.

* * * * *